J. G. DUTSCHKE.
EGG CASE FASTENING.
APPLICATION FILED JULY 24, 1909.
938,131.
Patented Oct. 26, 1909.
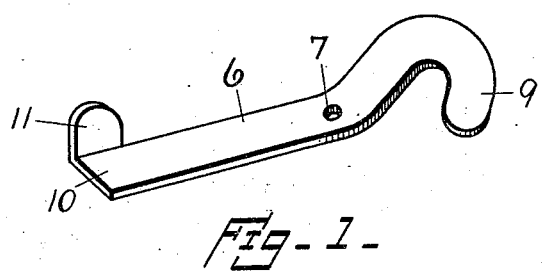
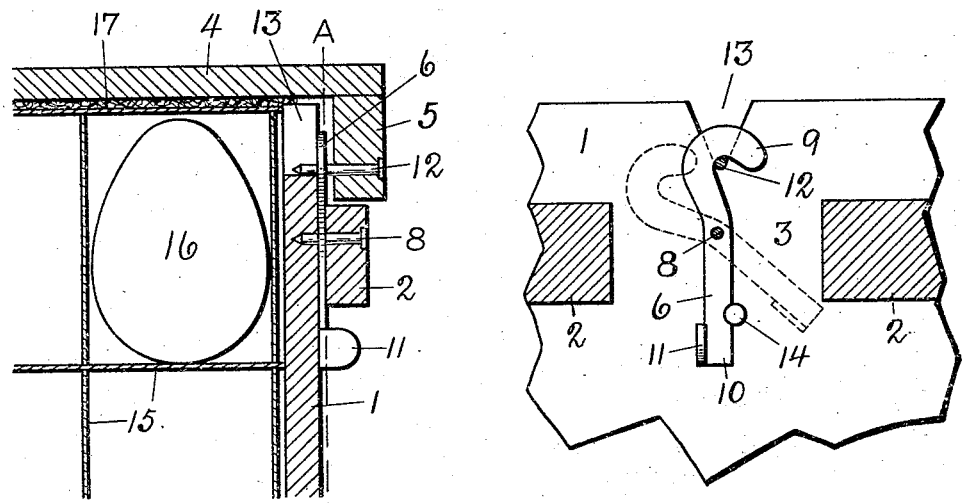
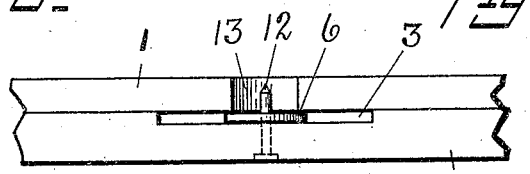
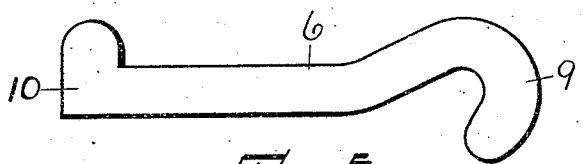
WITNESSES:
John E. Heller.
Mamie Norton
INVENTOR.
James G. Dutschke,
BY Abraham Knobel,
ATTORNEY.

UNITED STATES PATENT OFFICE.

JAMES G. DUTSCHKE, OF CECELIA, KENTUCKY, ASSIGNOR OF ONE-HALF TO ABRAHAM KNOBEL, OF LOUISVILLE, KENTUCKY.

EGG-CASE FASTENING.

938,131.  Specification of Letters Patent.  Patented Oct. 26, 1909.

Application filed July 24, 1909. Serial No. 509,318.

*To all whom it may concern:*

Be it known that I, JAMES G. DUTSCHKE, a citizen of the United States, residing at Cecelia, in the county of Hardin and State of Kentucky, have invented a new and useful Improvement in Egg-Case Fastenings, of which the following is a specification.

This invention relates to fastenings for the cover of egg cases; and the objects of my improvement are, simplicity of construction; comparative cheapness of manufacture, facility of manipulation; to avoid the necessity of hammering on the egg case to secure the cover, to obviate the breaking of eggs; to provide a structure of the class named which may be readily applied to the conventional egg-case; effectiveness; security; and compactness. These objects I attain by means of the structure illustrated in the accompanying drawings, in which—

Figure 1 is a perspective view of the hook; Fig. 2, a fragmentary sectional view of the egg-case with the hook applied; Fig. 3, a fragmentary end elevation of the egg-case, showing the cleat partly in longitudinal section; Fig. 4, a top plan view of one of the end walls; and, Fig. 5, a plan view of the blank from which the hook is formed.

Similar reference numerals refer to similar parts throughout the several views of the drawings.

The egg-case 1 is provided, across each end wall, with a cleat, 2, as usual, the cleat being placed a short distance below the top edge of the wall of the case, and being formed at its middle portion with a groove, 3, adjacent to the wall of the case. The cover, 4, of the case is provided at each end with a batten, 5, in the usual way, which is of sufficient width to reach downward almost to th upper edge of cleat 2. A hook, 6, is provided, preferably stamped from sheet metal and provided with a perforation, 7, adapted to receive a fulcrum or pivot-pin, 8. The arc of the inner wall of the hook portion, 9, of hook 6 is so arranged that its center is without the perforation 7, so that the wall of the hook portion forms an incline relative to perforation 7, in order that it may draw the engaging means closer to the perforation 7 as the hook portion 9 is advanced. The opposite end, 10, of the hook 6 is preferably provided with a turned-up portion, 11, which forms a handle for manipulating. The hook 6, thus formed, is mounted upon the end wall of the case 1 by means of a pivot pin, 8, which may be simply a nail driven through cleat 2 and into the wall of the case. The hook is thus located within the groove 3 between the cleat 2 and the wall of the case and is thus protected from injury or accidental displacement by coming in contact with outside objects. The hook 6 is also so located upon the end wall of case 1 that the extreme edge of hook portion 9 cannot extend above the top edge of the wall of case 1, and thus, when cover 4 is removed, the hook portion 9 is never exposed, above the wall of the case, to injury from boxes or other objects that may be placed and slid over the upper surface of the case.

For securing the cover 4 upon the box, engaging means for the hook portion 9 is provided on the cover, and preferably in the batten 5. This engaging means is provided, in a simple way, by a pin or nail, 12, which is driven into or through batten 5 in proper position to be engaged by hook portion 9.

In the upper edge of the end wall of case 1 is provided alining means, comprising a notch, 13, which is preferably larger at the top and tapers downward, so that at the bottom it is merely wide enough to accommodate pin 12. It will be understood that by means of this notch 13 the lid 4 may be placed upon the case so that pin 12 rests upon the upper edge of the end wall, and the lid slid sidewise until pin 12 drops into the notch, when it will center itself in the bottom of the notch, and thus the lid 4 will be brought into proper alinement with the case. This also brings pin 12 into proper position to be readily engaged by hook 6, which may then be swung to vertical position (Fig. 3). The hook 6 now holds pin 12 securely in notch 13, and consequently the lid 4 upon the egg-case, in the exact alinement desired. If it should be desired, for additional safety, a tack 14, or the like fastening, may be driven into the wall of the case, against the edge of hook 6, to prevent accidental displacement; and this, when it is desired to open the case, may be easily drawn. The filling within the case is shown at 15; and there is always placed over the eggs, 16, a sheet of strawboard or other packing, 17. This extends slightly above the upper edge of the case and forms a yielding support for the cover 4. Thus the cover, when placed upon the case, and engaged by hook 6, may be drawn down by the hook, and a springy or yielding engagement is attained between hook portion 9 and pin 12, so that hook portion 9 cannot easily swing out of operative position.

It is obvious that with this improvement it is not necessary to drive nails into the cover of the case in order to secure the cover, and thus are obviated the shocks caused by hammering, which may break the eggs, and also the splintering and destruction of egg-cases. The security of the fastening will be obvious. It will also be understood that this fastening may readily be applied to egg-cases already in use, by simply providing the cleats 2, with the groove 3 to accommodate the hook 6, driving the pins 8, providing the end walls of the case with the notches 13, and the battens 5 with the pins or nails 12. The hooks 6 may be cheaply manufactured by stamping from sheet or strap metal, thus making the first cost of the fastening very small.

Having thus described my invention, so that any one skilled in the art pertaining thereto may construct it, and any one may understand its use, I claim—

1. In a fastening for egg-cases, a lever, fulcrumed intermediate its ends on the egg-case, and provided at one end with a hook and at the opposite end with a handle, the lid of the egg-case provided with a batten at each end, a pin extending inward from said batten, said hook being arranged and adapted to engage said pin in said batten.

2. In an egg-case, means for fastening the cover, comprising a cleat across each end of the case, a batten across each end of the cover, a hook pivoted between the wall of the case and said cleat, and a pin extending inward from said batten, adapted for engagement with said hook, said hook being covered and protected by said cleat and said batten.

3. In an egg-case, fastening means for the cover comprising a hook pivoted on the wall of the case, a batten across each end of the cover of the case, means for engagement with said hook extending inward from said batten, and a notch in the top of the wall of the case adapted to receive said means for engagement with said hook and to aline and hold in alinement the cover with the egg-case.

JAMES G. DUTSCHKE.

Witnesses:
WM. J. SAUER,
ABRAHAM KNOBEL.